(12) United States Patent
Sanderson et al.

(10) Patent No.: US 11,811,200 B2
(45) Date of Patent: Nov. 7, 2023

(54) INSTALLATION TOOL AND METHOD

(71) Applicant: Airbus Operations Limited, Bristol (GB)

(72) Inventors: Timothy Sanderson, Bristol (GB); Stuart Quayle, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 1230 days.

(21) Appl. No.: 16/367,745

(22) Filed: Mar. 28, 2019

(65) Prior Publication Data
US 2019/0305530 A1    Oct. 3, 2019

(30) Foreign Application Priority Data
Mar. 29, 2018   (GB) ..................................... 1805158

(51) Int. Cl.
  *H02G 1/08*     (2006.01)
  *H02G 3/22*     (2006.01)
  *H02G 1/06*     (2006.01)
  *B64F 5/40*     (2017.01)
  *B64F 5/10*     (2017.01)
  *B60P 7/14*     (2006.01)
  *F16L 41/12*    (2006.01)
  *F16L 47/16*    (2006.01)
        (Continued)

(52) U.S. Cl.
  CPC ............. *H02G 1/085* (2013.01); *B25B 27/14* (2013.01); *B25B 27/16* (2013.01); *B60P 7/14* (2013.01);
        (Continued)

(58) Field of Classification Search
  CPC . B25B 27/14; B25B 27/16; B64F 5/10; B64F 5/40; B60P 7/14; B64C 1/10;
        (Continued)

(56) References Cited

U.S. PATENT DOCUMENTS 4,945,488 A * 7/1990 Carver ............. G05B 19/41805
                                                              700/182
5,050,282 A    9/1991 Zannini
        (Continued)

FOREIGN PATENT DOCUMENTS

EP    0 311 748 A2    4/1989
EP    0 311 748 A3    4/1989
        (Continued)

OTHER PUBLICATIONS

Combined Search and Examination Report for GB1805158.1, dated Sep. 13, 2018, 5 pages.
        (Continued)

*Primary Examiner* — Seahee Hong
(74) *Attorney, Agent, or Firm* — Nixon & Vanderhye P.C.

(57) ABSTRACT

An apparatus and method for installing an aircraft bulkhead connector with a bulkhead is disclosed where access to only one side of the bulkhead is required. The disclosure is also applicable to installation of bulkhead connectors in aircraft fuel tanks. An aircraft bulkhead connector and installation tool is also disclosed. The bulkhead connector includes a female end portion and the installation tool includes a male end portion. The male end portion of the installation tool is removably engaged with the female end portion of the bulkhead connector, such that the installation tool protrudes beyond the female end portion of the bulkhead connector. The installation tool may be inserted through an aperture in a bulkhead and used to both position and hold the bulkhead connector during the installation process.

12 Claims, 5 Drawing Sheets

(51) Int. Cl.
 F16L 47/20 (2006.01)
 B64D 37/00 (2006.01)
 B64C 1/10 (2006.01)
 B25B 27/16 (2006.01)
 B25B 27/14 (2006.01)

(52) U.S. Cl.
 CPC .............. *B64C 1/10* (2013.01); *B64D 37/005* (2013.01); *B64F 5/10* (2017.01); *B64F 5/40* (2017.01); *F16L 41/12* (2013.01); *F16L 47/16* (2013.01); *F16L 47/20* (2013.01); *H02G 1/06* (2013.01); *H02G 3/22* (2013.01)

(58) Field of Classification Search
 CPC ........ B64D 37/005; F16L 41/12; F16L 47/16; F16L 47/20
 See application file for complete search history.

(56) References Cited

U.S. PATENT DOCUMENTS

| | | | | |
|---|---|---|---|---|
| 6,884,025 | B2 * | 4/2005 | Pickens | F01D 17/16 415/160 |
| 9,303,664 | B2 * | 4/2016 | Keech | B23P 19/084 |
| 9,795,076 | B2 * | 10/2017 | Lind | F16L 41/14 |
| 2006/0214419 | A1 | 9/2006 | Heuer | |
| 2014/0232103 | A1 | 8/2014 | Waugh | |
| 2016/0288896 | A1 * | 10/2016 | Aske | B64F 5/00 |

FOREIGN PATENT DOCUMENTS

| WO | 99/42756 | 8/1999 |
|---|---|---|
| WO | 2017/157526 | 9/2017 |

OTHER PUBLICATIONS

Diehl Dan, "internal O-ring Insertion Tool Inserts Two O-rings into a Hub", YouTube dated Oct. 1, 2009, retrieved from the internet on Jul. 26, 2019 <URL:https://www.youtube.com/watch?v=9X7GzKMpx2Y>, two pages.

Arconic Fastening Systems Industrial: "HuckLok Structural Blind Fasteners", YouTube dated Mar. 10, 2018, retrieved from the internet on Jul. 26, 2019, <URL:https://www.youtube.com/watch?v=TMgIPk-U9GU>, one page.

Extended European Search Report for Application No. 19165500.0, 10 pages, dated Aug. 7, 2019.

* cited by examiner

INSTALLATION TOOL AND METHOD

CROSS RELATED APPLICATION

This application claims priority to United Kingdom (GB) patent application 1805158.1, filed Mar. 29, 2018, the entire contents of which are hereby incorporated by reference.

BACKGROUND OF THE INVENTION

The present disclosure relates to a bulkhead connector and installation tool, and a method of installing a bulkhead connector in a bulkhead.

Aircraft fuel systems of aircraft often include fuel tanks located inside the aircraft wings. In large aircraft wings, the wing may include many separate fuel tanks, separated by various structural elements of the wings, including ribs, spars, and bulkheads which make up the fuel tanks. In order to deliver fuel from the fuel tanks to the engines of the aircraft, a network of pipes may run through the wings, and in particular through various bulkheads in the wing. To allow the fuel pipes to pass through the bulkheads, bulkhead connectors are used. The connectors are attached to both sides of a bulkhead, and pass through an aperture in the bulkhead. To attach the bulkhead connectors to the bulkheads, engineers require access to both sides of the bulkhead, meaning that fuel tank access is necessary. There are various reasons why this is undesirable, including but not limited to; the potential for damaging the inside of the fuel tank during the bulkhead connector installation process; and/or health and safety considerations restricting access to the fuel tank.

The present invention seeks to mitigate the above-mentioned problems. Alternatively or additionally, the present invention seeks to provide an improved bulkhead connector, installation tool, and/or method of installing a bulkhead connector.

SUMMARY OF THE INVENTION

According to a first aspect, the invention provides an aircraft bulkhead connector and installation tool, wherein: the bulkhead connector comprises a female end portion and the installation tool comprises a male end portion; and the male end portion of the installation tool is removably engaged with the female end portion of the bulkhead connector, such that the installation tool protrudes beyond the female end portion of the bulkhead connector.

The invention provides an aircraft bulkhead connector and installation tool combination that allows the bulkhead connector to be positioned in the correct location with respect to a bulkhead during installation of the bulkhead connector, such that the bulkhead connector is located to one side of the bulkhead, and the installation tool protrudes through an aperture in the bulkhead to the other side of the bulkhead. The protrusion of the installation tool through the bulkhead allows the manipulation of the bulkhead connector without needing direct access to the bulkhead connector or the other side of the bulkhead. Therefore, the bulkhead connector and installation tool allow a "blind" or single side access installation process to take place. Once the bulkhead connector has been secured to the bulkhead, the installation tool may be removed from engagement with the bulkhead connector, preferably by removal through the aperture through which the installation tool protrudes. The aircraft bulkhead connector and installation tool may allow the construction of an aircraft wing fuel tank without requiring manholes in the fuel tank for use during the bulkhead connector installation process. Alternatively or additionally, the aircraft bulkhead connector and installation tool may provide a bulkhead connector which may be installed without an engineer requiring access to the inside of an aircraft fuel tank.

The installation tool may taper as it protrudes beyond the female end portion of the bulkhead connector. The taper may provide an advantage during the installation of the bulkhead connector, initially allowing some misalignment of the bulkhead connector and bulkhead as they are brought together, but then ensuring that the alignment is correct when the bulkhead connector and bulkhead are in contact, and about to be secured together.

The installation tool may comprise a plastic. A plastic installation tool may reduce any damage to either the bulkhead connector or a bulkhead during the installation of the bulkhead connector.

The female end portion of the bulkhead connector may comprise a groove, and the male end portion of the installation tool may comprise a shoulder, wherein the installation tool may be removably engaged with the bulkhead connector by a temporary fastener located in the groove of the female end portion of the bulkhead connector obstructing the movement of the shoulder of the male end of the installation tool. Provision of such a temporary fastener may allow simple engagement of the bulkhead connector and installation tool prior to the installation of the bulkhead connector and simple removal of the bulkhead connector and installation tool once installation of the bulkhead connector is complete. The temporary fastener may comprise a circlip, or other conventional removable fasteners. The temporary fastener may be removed by conventional tools such as pliers.

The male end portion of the installation tool and the female end portion of the bulkhead connector may be threaded, such that the male end portion of the installation tool and the female end portion of the bulkhead connector may be removably engaged via those threads. Provision of such a threaded arrangement may allow simple engagement of the bulkhead connector and installation tool prior to the installation of the bulkhead connector and simple removal of the bulkhead connector and installation tool once installation of the bulkhead connector is complete. In such an arrangement, no additional tools are required to disengage the bulkhead connector and installation tool. The threaded arrangement may comprise a full or partial thread. A partial thread is one in which the thread does not extend around the entire circumference of the male end portion and/or the female end portion.

The male end portion of the installation tool may comprise one or more biased loaded latches, and the female end portion of the bulkhead connector may comprise an associated indent, whereby the male end portion of the installation tool and the female end portion of the bulkhead connector may be removably engaged via the one or more biased latch and associated indent. Provision of one or more biased latches and associated indents may allow simple engagement of the bulkhead connector and installation tool prior to the installation of the bulkhead connector and simple removal of the bulkhead connector and installation tool once installation of the bulkhead connector is complete. The biased latches may comprise actual spring elements, or may be arranged to be compressed when the installation tool is in engagement with the bulkhead connector, such that the compression of the latch provides the biasing force required to keep the latch engaged with the associated indent.

The releasable engagement between the bulkhead connector and installation tool may be such that the installation tool is not damaged during the removal of the installation tool from the bulkhead connector. The installation tool may be reusable, such that the installation tool may be used during the installation process of a number of bulkhead connectors. Provision of a reusable tool may further reduce the costs of the installation process.

The bulkhead connector may comprise an engagement face 27, for example a flange, wherein the engagement face 27 is arranged to be located in contact with a bulkhead, the engagement face further comprising one or more fasteners. The one or more fasteners may be threaded fasteners arranged to receive threaded bolts. The engagement face may comprise a seal groove. The seal groove may be configured to receive a seal, which, when the bulkhead connector is installed on a bulkhead, seals the connection between the bulkhead connector and bulkhead. The seal may be an O-ring configured to be located in the seal groove. The seal may be temporarily held in the seal groove prior to installation of the bulkhead connector by grease, such as petroleum jelly, or an adhesive.

The bulkhead connector may comprise a protruding engagement end, extending beyond the engagement face, and arranged such that when the engagement face is located in contact with a bulkhead, the engagement end protrudes through the bulkhead. The engagement end may comprise a threaded external surface, such that a nut may be used to secure the engagement end, and consequently the bulkhead connector, in position relative to the bulkhead. Such an engagement may be completed requiring access to only a single side of the bulkhead, and specifically the opposite side to which the engagement face of the bulkhead connector is brought into contact.

According to a second aspect, the invention provides an aircraft bulkhead connector, the bulkhead connector comprising a female end portion, the female end portion configured for removable engagement with an associated installation tool, such that the installation tool protrudes from the female end portion. The female end portion may comprise a groove for receiving a temporary fastener, for example a circlip, or a groove for receiving a biased latch, or a threaded section.

According to a third aspect, the invention provides an installation tool, the installation tool comprising a male end portion, the male end portion configured for removable engagement with an associated aircraft bulkhead connector, such that the male end portion protrudes from the bulkhead connector. The male end portion may comprise a shoulder. The installation tool may taper away from the male end portion configured for removable engagement with an associated bulkhead connector. The installation tool may comprise a plastic. The installation tool may comprise one or more biased latches, or a threaded section.

According to a fourth aspect, the invention provides an aircraft wing, the aircraft wing comprising an aircraft bulkhead connector according to the second aspect of the invention.

According to a fifth aspect, the invention provides an aircraft, the aircraft comprising an aircraft wing according to the fourth aspect of the invention.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

According to a sixth aspect, the invention provides an aircraft, the aircraft comprising an aircraft bulkhead connector according to the second aspect of the invention According to a seventh aspect, the invention provides a method of installing an aircraft bulkhead connector in an aircraft wing, the method comprising the steps of: providing and locating a bulkhead connector in the aircraft wing; removably engaging an installation tool with the bulkhead connector; providing a bulkhead, the bulkhead comprising an aperture for association with the bulkhead connector; locating and securing the bulkhead in the aircraft wing, including aligning the bulkhead connector with the aperture of the bulkhead by passing the installation tool through the aperture; securing the bulkhead connector to the bulkhead; and removing the installation tool from the bulkhead connector.

The method may allow the installation of a bulkhead connector whilst requiring access to only one side of the bulkhead. The method may allow the installation of a bulkhead connector requiring access to only one side of the bulkhead, and in particular access to the opposite side of the bulkhead to the side on which the bulkhead connector is to be located.

The step of securing the bulkhead connector to the bulkhead may comprise passing fasteners through pre-made holes in the bulkhead into the bulkhead connector.

The method may further comprises the step of locating a seal between the bulkhead connector and bulkhead, prior to securing the bulkhead connector to the bulkhead.

The step of removably engaging the bulkhead connector with the installation tool may comprise provision of a temporary fastener which obstructs removal of the installation tool from the bulkhead connector, and the step of removing the installation tool from the bulkhead connector may comprise removal of the temporary fastener. The temporary fastener may be a circlip.

The bulkhead connector and installation tool may be threaded, and the step of removably engaging the installation tool with the installation tool comprises screwing the installation tool into the bulkhead connector, and the step of removing the installation tool from the bulkhead connector may comprise unscrewing the installation tool from the bulkhead connector.

The term 'or' shall be interpreted as 'and/or' unless the context requires otherwise.

It will of course be appreciated that features described in relation to one aspect of the present invention may be incorporated into other aspects of the present invention. For example, the method of the invention may incorporate any of the features described with reference to the apparatus of the invention and vice versa, and features described with reference to apparatus of one aspect of the invention may be incorporated into apparatus according to other aspects of the invention.

DESCRIPTION OF THE DRAWINGS

Embodiments of the present invention will now be described by way of example only with reference to the accompanying schematic drawings of which.

DETAILED DESCRIPTION

Figure 1:
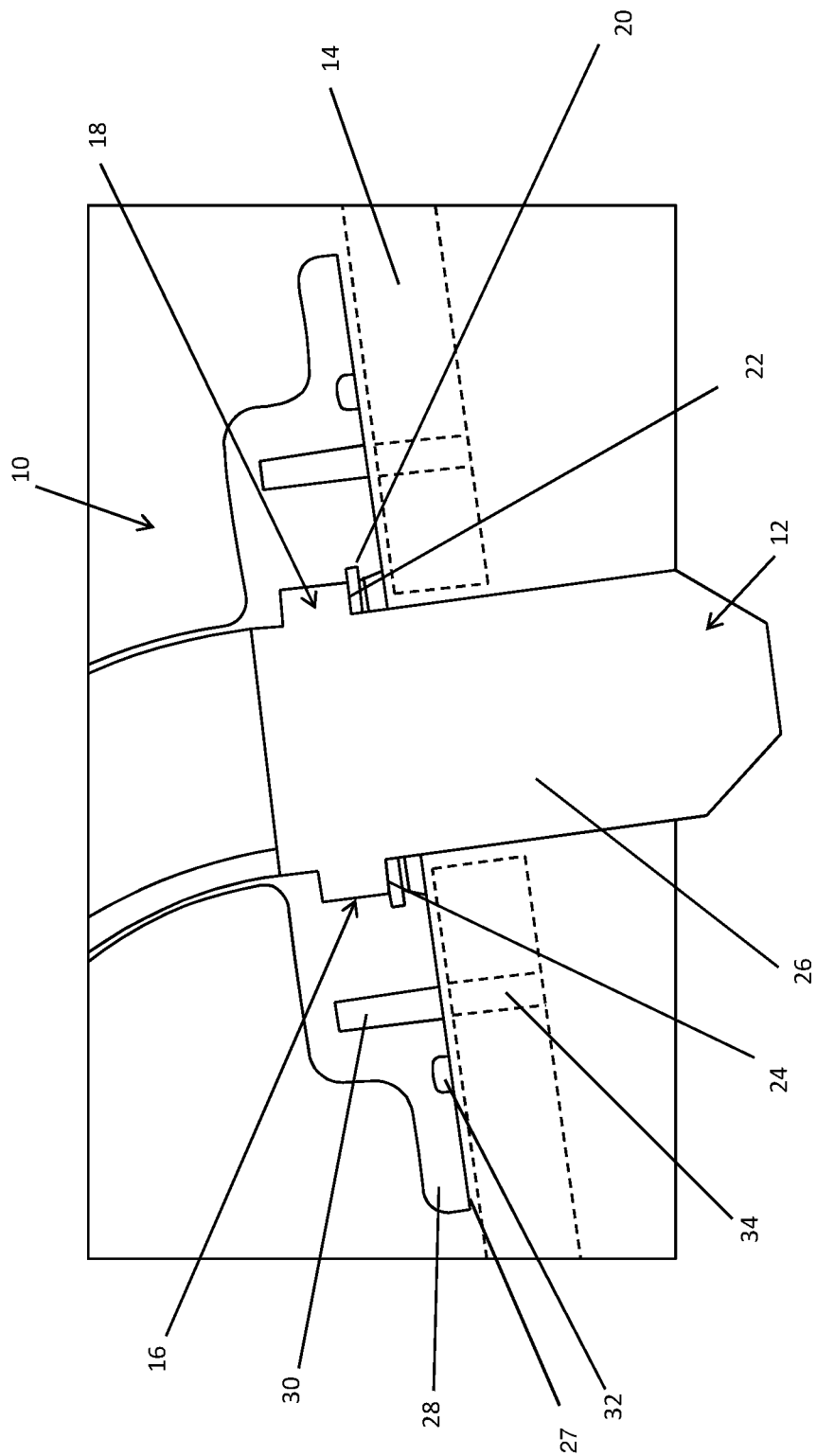
FIG. 1 shows a cross-sectional view of a bulkhead connector and installation tool according to a first embodiment of the invention.
Figure 2:
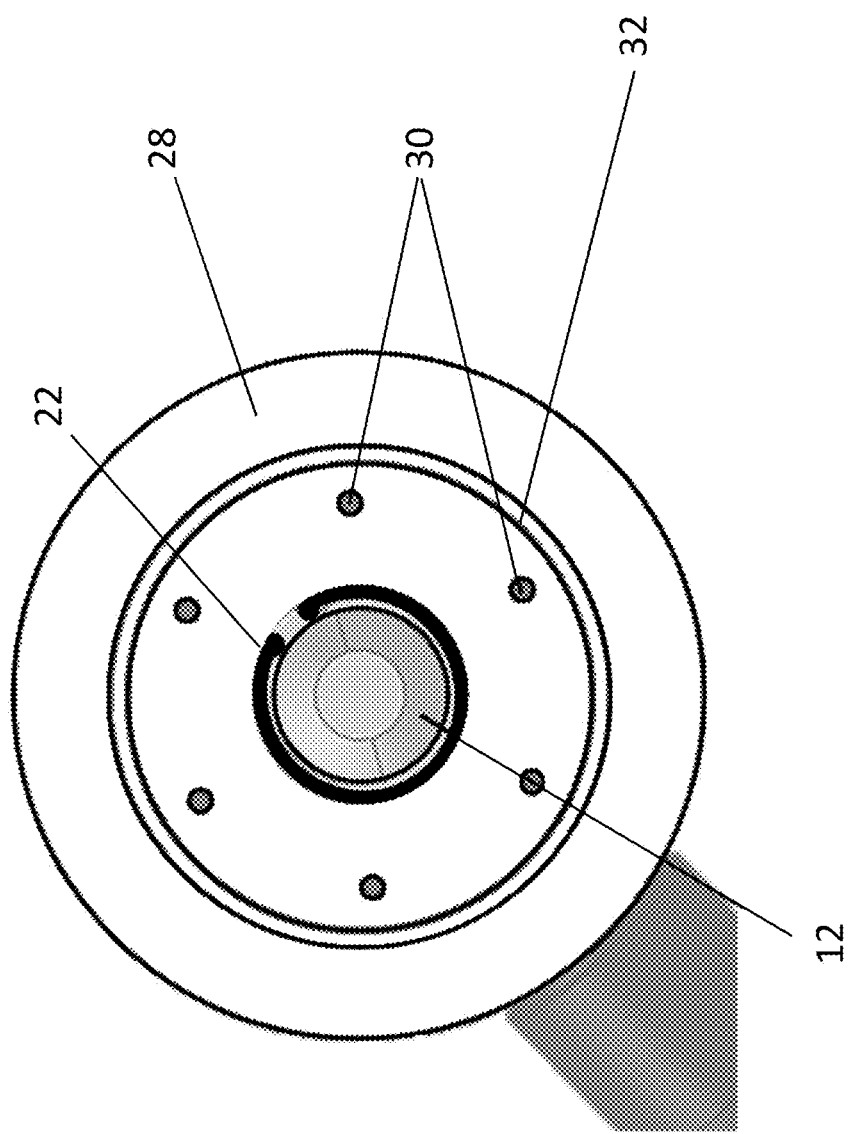
FIG. 2 shows an end view of the bulkhead connector and installation tool of FIG. 1.

FIGS. 1 and 2 show an aircraft bulkhead connector 10 and installation tool 12 according to a first embodiment of the invention. The dashed lines 14 show a bulkhead to which the bulkhead connector will be secured once correctly located. The bulkhead connector 10 includes a female end portion 16 with which a male end portion 18 of the installation tool 12 is removably engaged. To facilitate the removable engagement of the female end portion 16 with the male end portion 18, the female end portion 16 includes a groove 20 in which a removable fastener 22 (in this case a cir-clip) may be located. The male end portion 18 of the installation tool 12 includes a shoulder 24 which, when the male end portion 18 of the installation tool 12 is removably engaged with the female end portion 16 of the bulkhead connector, is obstructed by the removable fastener 22. To prepare the bulkhead connector 10 for installation, a user first inserts the male end portion 18 of the installation tool 12 into the female end portion of the bulkhead connector 10. The removable fastener 22 is then positioned in the groove 20 of the female end portion 16, such that removal of the male end portion 18 from the female end portion 16 is obstructed. The bulkhead 14 may then be correctly positioned with respect to the bulkhead connector 10. This may take the form of moving the bulkhead connector 10 towards the bulkhead 14, moving the bulkhead 14 towards the bulkhead connector 10, or a combination of both actions. The bulkhead 14 comprises an aperture with which the bulkhead connector 10 needs to be aligned. The aperture may be non-circular, and the installation tool 12 may comprise a corresponding cross-sectional shape, thereby allowing the orientation of the bulkhead connector 10 to be correctly positioned during the installation process. The installation tool 12 includes a body portion 26 which protrudes beyond the female end portion 16 of the bulkhead connector 10, and which is tapered towards the distal end, as shown in the figures. The installation tool 12 is passed through the aperture in the bulkhead 14, thereby ensuring that the bulkhead connector is correctly located relative to the bulkhead 14. The tapered end of the body portion 26 of the installation tool 12 allows easier alignment of the installation tool 12 and the bulkhead 14. The installation tool may be made of, or at least coated in, a plastic or rubber material. A plastic or rubber installation tool may reduce damage caused to the bulkhead and bulkhead connector during the installation process. Once the bulkhead connector 10 has been correctly located, the bulkhead connector 10 is secured to the bulkhead 14. Further details on the securing process are provided below. Then, once securely fastened to the bulkhead 14, the removable fastener 22 is removed from the groove 20, using a set of suitable pliers. Once the removable fastener 22 is removed, there is nothing obstructing the shoulder 24 of the male end portion 18, and the installation tool 12 may be pulled away from the bulkhead connector 10, through the aperture in the bulkhead 14.

The bulkhead connector 10 comprises a flange 28 which extends radially outwards from the female end portion 16 and which is configured to be brought into contact with the bulkhead 14. The flange 28 includes a plurality of threaded fastening holes 30 which are configured to receive bolts through corresponding holes 34 in the bulkhead 14. The flange 28 also includes a groove 32 into which a seal may be placed to ensure a good sealing contact with the bulkhead 14 when the bulkhead connector 10 is installed. The seal may be held in place in the groove 32 prior to installation by application of an adhesive or grease, such as petroleum jelly. As can be seen in FIG. 1, the installation tool 12 allows the bulkhead connector 10 to be correctly positioned relative to the bulkhead 14 and held in place without requiring access to the side of the bulkhead 14 on which the bulkhead connector 10 is installed. Additionally, the securing of the bulkhead connector may be completed without requiring access to the side of the bulkhead 14 on which the bulkhead connector 10 is installed.

In an alternative embodiment, the male end portion 18 of the installation tool 12 and the female end portion 16 of the bulkhead connector 10 may be threaded, such that the bulkhead connector 10 and installation tool 12 may be removably engaged by screwing them together. The skilled person will appreciate this is a relatively straightforward variation of the first embodiment, and other than a different method of removable engagement and disengagement, the apparatus and method as described with respect to the first embodiment apply.

Figure 3:
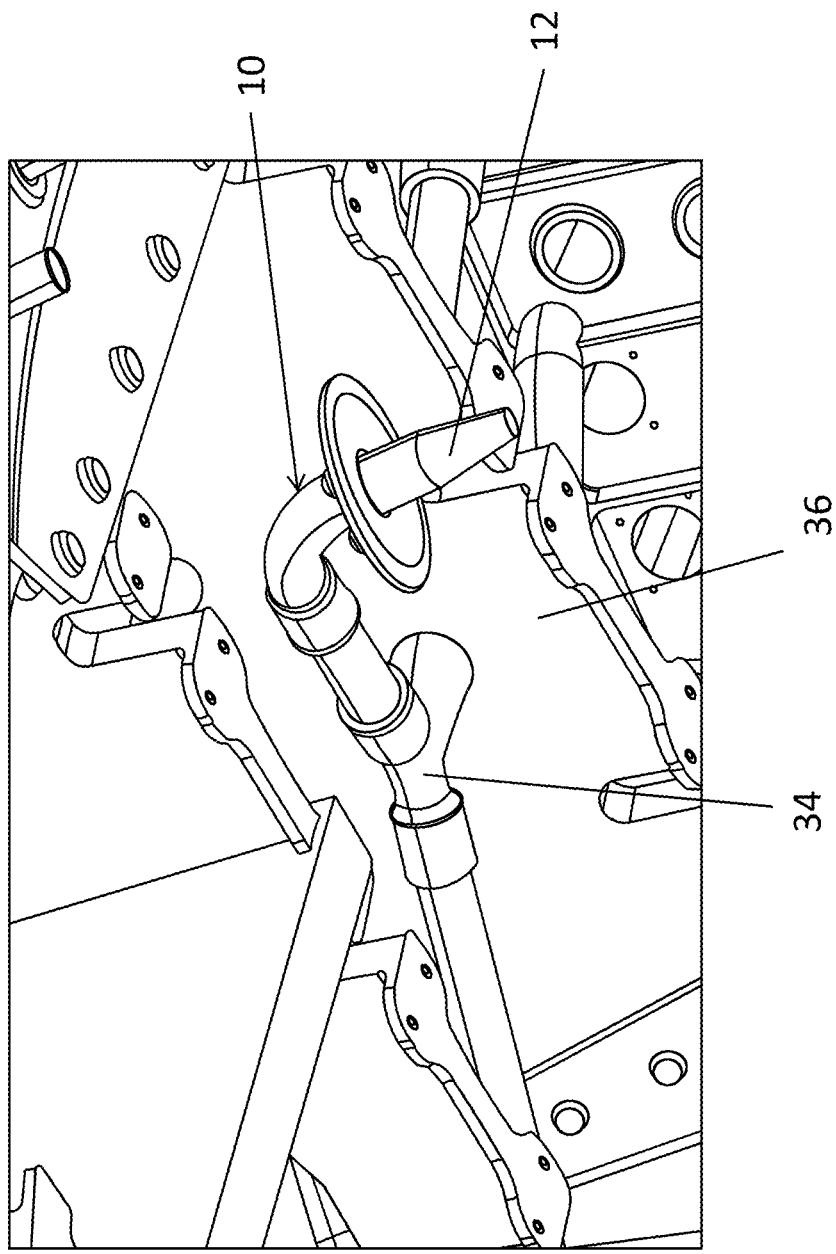
FIG. 3 shows a bulkhead connector and installation tool according to an embodiment of the invention located in an aircraft wing fuel tank prior to a bulkhead being installed.
Figure 4:
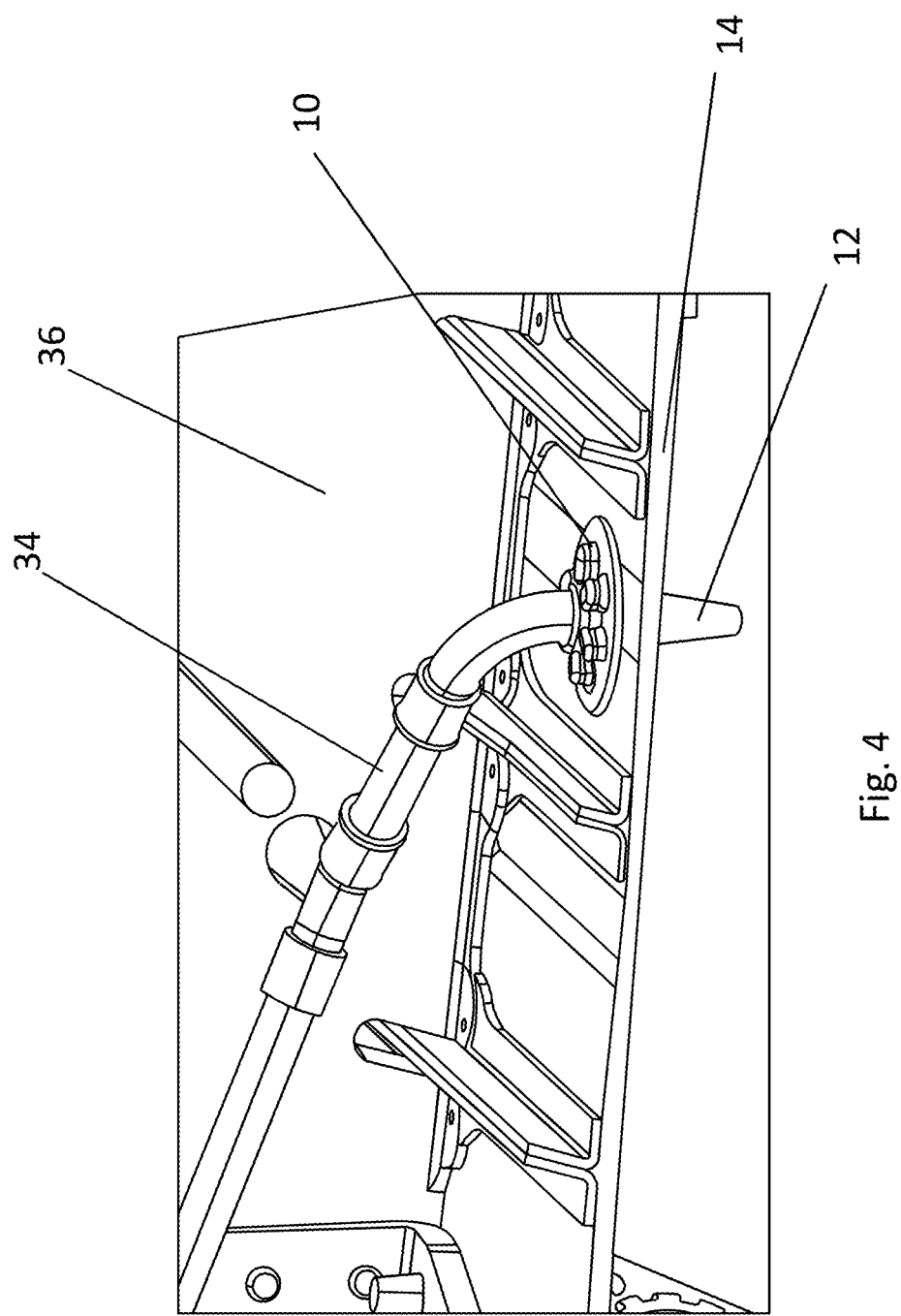
FIG. 4 shows a bulkhead connector and installation tool according to an embodiment of the invention located in an aircraft wing fuel tank once the bulkhead has been installed.

FIGS. 3 and 4 show the aircraft bulkhead connector 10 and installation tool 12 in situ in a fuel system of an aircraft wing. In FIG. 3 the installation process is underway, but the bulkhead 14 has not yet been installed. The bulkhead connector 10 has been connected to the fuel system pipework 34 which is secured to the rib structure 36 of the wing. FIG. 4 shows how the bulkhead 14 may be positioned to close off a fuel tank, where the bulkhead 14 is attached to a number of spars and/or ribs. FIG. 4 also illustrates how the installation tool is passed through the bulkhead 14, and allows installation of the bulkhead connector 10 without requiring access to the inside of the fuel tank. In a yet further embodiment, the installation tool may comprise one or more biased latches that removably engage with corresponding indents on the bulkhead connector.

Figure 5:
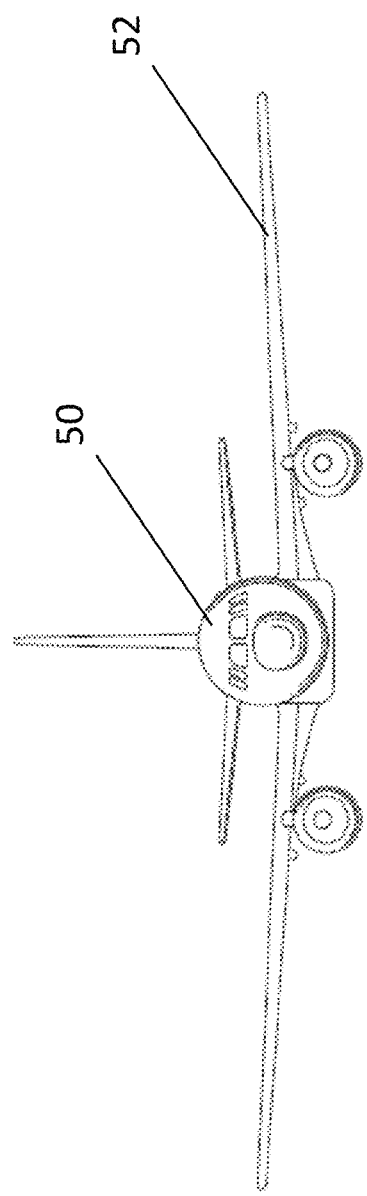
FIG. 5 shows an aircraft including an aircraft wing, the aircraft wing including a bulkhead connector according to an embodiment of the invention.

FIG. 5 shows an aircraft 50 comprising an aircraft wing 52 in which an aircraft fuel tank includes an aircraft bulkhead connector as described above.

Whilst the present invention has been described and illustrated with reference to particular embodiments, it will be appreciated by those of ordinary skill in the art that the invention lends itself to many different variations not specifically illustrated herein. For example, the bulkhead connector may comprise a protruding engagement end, extending beyond the engagement face, and arranged such that when the engagement face is located in contact with a bulkhead, the engagement end protrudes through the bulkhead. The engagement end may comprise a threaded external surface, such that a nut may be used to secure the engagement end, and consequently the bulkhead connector, in position relative to the bulkhead. Such an engagement may be completed requiring access to only a single side of the bulkhead, and specifically the opposite side to which the engagement face of the bulkhead connector is brought into contact. The protruding engagement end may comprise the female end portion of the bulkhead connector. The protruding engagement end may replace or act in conjunction to the fasteners described with reference to the engagement face of the bulkhead connector.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A combination of an aircraft bulkhead connector and an installation tool, wherein:
    the bulkhead connector comprises a female end portion and the installation tool comprises a male end portion opposing a distal end portion of the installation tool;
    the male end portion of the installation tool is removably engaged with the female end portion of the bulkhead connector, such that the installation tool protrudes beyond the female end portion of the bulkhead connector in a direction away from the bulkhead connector such that the installation tool passes through the bulkhead; and,
    wherein the installation tool tapers at the distal end portion protruding beyond the bulkhead.

2. The combination of the aircraft bulkhead connector and the installation tool as claimed in claim 1, wherein the installation tool comprises a plastic.

3. The combination of the aircraft bulkhead connector and the installation tool as claimed in claim 1, wherein the female end portion of the bulkhead connector comprises a groove, and the male end portion of the installation tool comprises a shoulder, wherein the installation tool is removably engaged with the bulkhead connector by a temporary fastener located in the groove of the female end portion of the bulkhead connector obstructing the movement of the shoulder of the male end of the installation tool.

4. The combination of the aircraft bulkhead connector and the installation tool as claimed in claim 1, wherein the male end portion of the installation tool and the female end portion of the bulkhead connector are threaded, such that the male end portion of the installation tool and the female end portion of the bulkhead connector are removably engaged via the threads of the male end portion and thread of female end portion of the bulkhead connector.

5. The combination of the aircraft bulkhead connector and the installation tool as claimed in claim 1, wherein the bulkhead connector comprises an engagement face, wherein the engagement face is arranged to be located in contact with a bulkhead, the engagement face further comprising one or more fasteners.

6. The combination of the aircraft bulkhead connector and the installation tool as claimed in claim 5, wherein the one or more fasteners are threaded fasteners arranged to receive threaded bolts.

7. A method of installing an aircraft bulkhead connector in an aircraft wing, the method comprising the steps of:
    providing and locating the bulkhead connector comprising a female end portion in the aircraft wing;
    providing an installation tool comprising a male end portion opposing a distal end portion of the installation tool;
    removably engaging the male end portion of the installation tool with the female end portion of the bulkhead connector;
    providing a bulkhead, the bulkhead comprising an aperture for association with the bulkhead connector;
    locating and securing the bulkhead in the aircraft wing, including aligning the bulkhead with the aperture of the bulkhead connector by passing the installation tool through the aperture;
    securing the bulkhead connector to the bulkhead by protruding the installation tool beyond the bulkhead connector in a direction away from the bulkhead connector such that the installation tool passes through the bulkhead;
    removing the installation tool from the bulkhead connector; and,
    wherein the installation tool tapers at the distal end portion protruding beyond the bulkhead.

8. The method as claimed in claim 7, wherein the step of securing the bulkhead connector to the bulkhead comprises passing fasteners through pre-made holes in the bulkhead into the bulkhead connector.

9. The method as claimed in claim 7, further comprising the step of locating a seal between the bulkhead connector and bulkhead, prior to securing the bulkhead connector to the bulkhead.

10. The method as claimed in claim 7, wherein the step of removably engaging the bulkhead connector with the installation tool comprises provision of a temporary fastener which obstructs removal of the installation tool from the bulkhead connector, and wherein the step of removing the installation tool from the bulkhead connector comprises removal of the temporary fastener.

11. The method as claimed in claim 10, wherein the temporary fastener is a circlip.

12. The method as claimed in claim 7, wherein the bulkhead connector and installation tool are threaded, and the step of removably engaging the installation tool with the bulkhead connector comprises screwing the installation tool into the bulkhead connector, and the step of removing the installation tool from the bulkhead connector comprises unscrewing the installation tool from the bulkhead connector.

* * * * *